Nov. 23, 1965  O. EPSTEIN  3,219,362

FLEXIBLE LANDING GEAR FOOT

Filed June 3, 1964

INVENTOR.
OSCAR EPSTEIN
BY
*Millman and Jacobs*
ATTORNEYS

United States Patent Office 3,219,362
Patented Nov. 23, 1965

3,219,362
FLEXIBLE LANDING GEAR FOOT
Oscar Epstein, Southampton, Pa., assignor to Strick Trailers, a Division of Fruehauf Corporation, Fairless Hills, Pa., a corporation of Michigan
Filed June 3, 1964, Ser. No. 372,320
6 Claims. (Cl. 280—150.5)

This invention relates generally to landing gears for trailers and more particularly to the construction of a landing gear foot.

At present, most landing gears for trailers are equipped with metallic pivoted or articulated ground-engaging feet. The disadvantages of these landing gears become manifest when the trailer is coupled or uncoupled to the tractor during which landing gears are subjected to a large impact load both vertically and horizontally on the foot thereof. Thus, if the feet are on soft ground, such as macadam, the tendency is for the feet to sink in, and when the trailer is pushed back upon coupling, the feet will stick and the legs will thus be subjected to forces tending to twist and even break the legs. If the feet are on a rough surface, the high friction between the feet and the rough surface will also tend to prevent the legs from moving rearwardly on coupling and thus the legs will again be subjected to forces tending to twist or shear them.

It is the primary object of this invention to provide a resilient landing gear foot which overcomes the disadvantages of the metallic pivoted or articulated foot presently in use, as noted above.

Another object of the invention is to provide a resilient foot for a trailer landing gear of such construction that compressive as well as shear forces are absorbed by the landing gear during loading and coupling and uncoupling of a tractor to the trailer without consequent twisting or fracture of the legs or damage to articles stored in said trailer.

Another object of the invention is to provide a resilient trailer landing gear foot consisting of spaced rubber pads bonded between upper and lower metallic plates to permit conformity to unbalanced loads and uneven ground while providing proper resiliency both for heavy and light loads.

Yet another object is to provide a resilient foot for a trailer landing gear which is self-contained and easily removable for subsequent replacement or repair.

These and other objects of the invention will become more apparent as the following description proceeds in conjunction with the accompanying drawings, wherein.

Indicated generally at 10 is a conventional trailer body having a pair of landing gears 12 mounted towards the front thereof. The present invention is applicable to fixed, pivoted and retractable landing gears as well as supports which are vertically extensible, as by jack mechanisms. The landing gear includes a leg 14 which may be of any desired cross-sectional shape, but preferably rectangular, and the flexible ground-engaging foot 16 of the instant invention is secured to the bottom of the leg.

Figure 2:
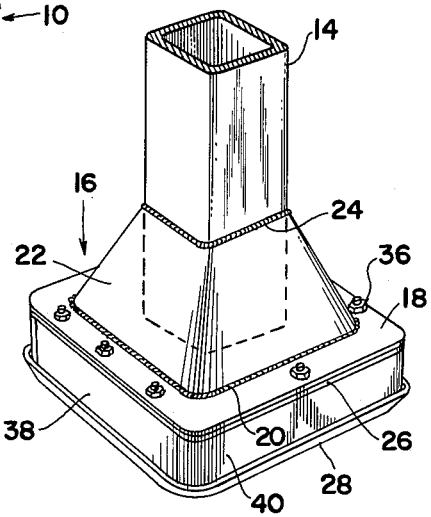
FIG. 2 is an enlarged perspective view of the present foot of the landing gear.
Figure 3:
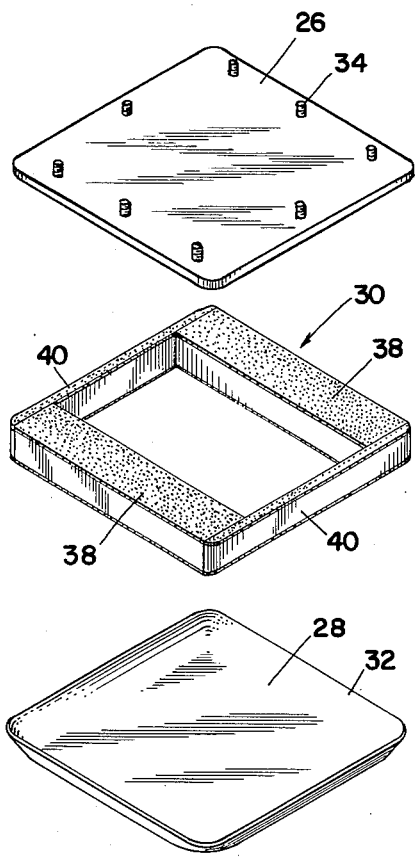
FIG. 3 is an exploded perspective view of the instant foot.

The foot consists of a removable unit for economical and ready replacement and repair, as shown in FIG. 3, and a portion fixed to the leg as shown in FIG. 2, the latter comprising a metallic plate 18, preferably rectangular, to which is welded as at 20, inwardly of its periphery, a bracket 22 in the form of a frustum of a pyramid. The leg 14 extends through the top of the frustum and is welded thereto as at 24, the bracket acting to distribute the load continuously and outwardly of the leg to the plate 18.

The removable unit comprises an upper metallic plate 26, a lower or ground engaging metallic plate 28 and a resilient member 30 therebetween. The peripheral edge of the lower plate 28 is upturned as at 32 to prevent the same from sticking in soft ground. The upper plate 26 includes upstanding threaded bolts or studs 34 which can extend through matching holes in the fixed plate 18 there to be secured by appropriate nuts 36. Plates 18 and 26 are preferably flat while ground-engaging plate 28 is preferably dished, all three plates being substantially coextensive.

The resilient member comprises a pair of spaced longitudinally extending shear and compression pads of rubber 38 and a pair of transversely spaced rubber closure pieces 40. The edges of the pads 38 are secured to the corner pieces by appropriate adhesive and the upper and lower surfaces of the rubber pads and pieces are secured by adhesive to lower and upper surfaces respectively of the upper and lower plates 26 and 28 thus forming a sandwich of metallic plates with spaced rubber shear and compression pads therebetween, the cover pieces serving to exclude dirt, grease and foreign matter from the interior thereof.

The rubber used should be an oil-resistant, solid elastomer with resiliency down to −10° F. and a durometer hardness of 40–50. The use of spaced apart resilient pads 38 serves the dual function first of providing increased resiliency, i.e. deflection in lbs./in.$^2$, as compared to a solid rubber block which is too stiff, and second of allowing better conformity to unbalanced loads and to uneven terrain.

Figure 1:
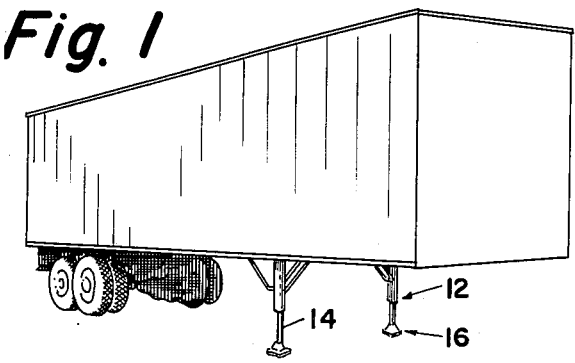
FIG. 1 is a perspective view of a trailer body equipped with pivoted landing gears and the flexible feet of the present invention.
Figure 4:
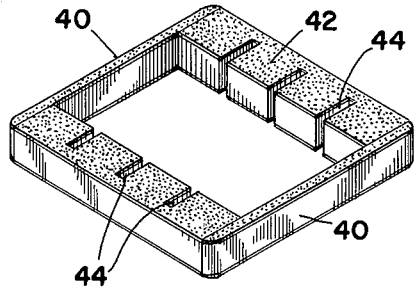
FIG. 4 is a modified form of the instant foot.

To increase the resiliency when lighter loads are carried in the trailer, the modification of FIG. 4 is preferred. The shear blocks 42 shown therein are the same as blocks 38 previously described except that they contain longitudinally spaced transverse slits 44. If desired, the slits can extend transversely entirely through the blocks thereby providing individual smaller spaced blocks. However, such a construction would require additional longitudinal covers. The blocks 42 and covers 40 are interposed between and adhered to the upper and lower plates 26 and 28 in the manner previously described with reference to FIGS. 1–3.

Dimensionally, it is preferred that the foot, i.e. the plates 26 and 28, be 12" by 12" and the shear and compression pads 38 be 2" thick, 4" wide and 11" long. It has been found that when the pads are one inch thick, the foot is too stiff for proper absorption of impact forces, and when they are three inches thick the foot is too soft. In the latter case, structural damage may occur elsewhere and the trailer will tend to nose down and thereby create difficulties for fifth-wheel clearance. The two-inch thickness of the pads is also good for absorption of horizontal shear forces normally tending to twist or break the legs when non-flexible feet are used.

Drop tests were performed with the instant invention by pulling out the tractor and allowing the laden trailer body to drop on the feet of the landing gears at different heights. As compared to solid metallic feet or rollers at the ground-engaging ends of the landing gear legs, the shock load was reduced as much as 30%, as measured by accelerometers. Horizontal or shear shock tests were performed by dragging and pushing the body while the feet engaged the ground. The instant flexible feet chattered and absorbed the fore and aft shock as compared to the twisting and at times the breaking of legs with solid feet.

While a preferred embodiment of the invention has been shown and described, a skilled artisan may make minor variations without departing from the spirit of the invention and the scope of the appended claims.

I claim:

1. In combination with a vehicle landing gear including a leg, a bracket secured to the bottom thereof including a laterally extending portion, an upper plate, a lower ground-engaging plate, spaced resilient elongated blocks interposed and adhesively secured between said upper and lower plates, and means securing said upper plate to said laterally extending portion of said bracket, said blocks being made of a solid elastomer having a durometer hardness of 40–50 and being substantially two inches thick in the dimension vertically between said upper and lower plates.

2. The combination of claim 1 wherein said blocks include longitudinally spaced transverse slits.

3. The combination of claim 1 wherein laterally extending portion of said bracket and said upper and lower plates are substantially rectangular and coextensive and said elastomeric blocks are spaced centrally from each other and are secured between said plates adjacent a pair of opposite edges thereof.

4. The combination of claim 1 wherein said lower ground-engaging plate is dished to provide an upwardly curving peripheral edge.

5. The combination of claim 1 wherein said means securing said upper plate to said laterally extending portion of said bracket is removable and includes threaded members upstanding from said upper plate and extending through said laterally extending portion, and closures on said threaded members.

6. In combination with a vehicle landing gear including a leg, a foot unit therefor including a sandwich comprised of upper and lower rigid plates and at least one resilient member adhesively secured therebetween and means securing said upper plate to said leg, said resilient member being a solid elastomer having a durometer hardness of 40–50 and being substantially two inches thick in the dimension vertically between said upper and lower plates.

References Cited by the Examiner

UNITED STATES PATENTS

| | | | |
|---|---|---|---|
| 1,524,083 | 1/1925 | Clement | 280—150.5 X |
| 2,044,649 | 6/1936 | Swennes | 267—63 X |
| 2,233,135 | 2/1941 | Ketel | 254—86 |
| 2,571,615 | 10/1951 | Romeo | 254—86 |
| 2,612,230 | 9/1952 | Jezler | 180—1 |
| 2,854,232 | 9/1958 | Roschi | 267—63 |

FOREIGN PATENTS

| | | |
|---|---|---|
| 669,121 | 7/1929 | France |

BENJAMIN HERSH, *Primary Examiner.*